(12) United States Patent
Larsson

(10) Patent No.: US 8,911,662 B2
(45) Date of Patent: Dec. 16, 2014

(54) POWDER, METHOD OF MANUFACTURING A COMPONENT AND COMPONENT

(75) Inventor: Mats Larsson, Helsingborg (SE)

(73) Assignee: Hoganas AB, Hoganas (SE)

( * ) Notice: Subject to any disclaimer, the term of this patent is extended or adjusted under 35 U.S.C. 154(b) by 1139 days.

(21) Appl. No.: 12/519,367

(22) PCT Filed: Dec. 28, 2007

(86) PCT No.: PCT/SE2007/051086
§ 371 (c)(1),
(2), (4) Date: Jun. 16, 2009

(87) PCT Pub. No.: WO2008/082353
PCT Pub. Date: Jul. 10, 2008

(65) Prior Publication Data
US 2010/0054982 A1 Mar. 4, 2010

Related U.S. Application Data

(60) Provisional application No. 60/877,649, filed on Dec. 29, 2006.

(30) Foreign Application Priority Data

Dec. 29, 2006 (SE) ...................................... 0602838

(51) Int. Cl.
*B22F 1/00* (2006.01)
*B22F 1/02* (2006.01)
*F16C 33/12* (2006.01)

(52) U.S. Cl.
CPC ............... *B22F 1/025* (2013.01); *B22F 1/0085* (2013.01); *F16C 33/12* (2013.01); *B22F 2998/00* (2013.01); *B22F 2998/10* (2013.01); *B22F 2999/00* (2013.01)
USPC .................... 419/30; 419/36; 419/39; 419/47; 148/513; 148/400

(58) Field of Classification Search
CPC ......... B22F 1/025; B22F 1/0085; F16C 33/12
USPC ......................... 75/255; 419/36, 30
See application file for complete search history.

(56) References Cited

U.S. PATENT DOCUMENTS

| 4,643,765 | A | 2/1987 | Takajo | |
|---|---|---|---|---|
| 5,256,185 | A | 10/1993 | Semel et al. | |
| 2003/0103858 | A1* | 6/2003 | Baran et al. | 419/30 |
| 2007/0186722 | A1* | 8/2007 | Hanejko | 75/252 |
| 2007/0231182 | A1* | 10/2007 | Veloff et al. | 419/22 |

FOREIGN PATENT DOCUMENTS

| DE | 1 094 780 | B | 12/1960 |
|---|---|---|---|
| GB | 1 162 702 | A | 8/1969 |
| GB | 1 595 346 | A | 8/1981 |
| GB | 2 216 545 | A | 10/1989 |
| JP | 59-050101 | A | 3/1984 |

OTHER PUBLICATIONS

International Search Report (PCT/ISA/210) for PCT/SE2007/051086 dated Mar. 4, 2008.
Written Opinion (PCT/ISA/237) for PCT/SE2007/051086 dated Mar. 4, 2008.

* cited by examiner

*Primary Examiner* — Jessee Roe
*Assistant Examiner* — Christopher Kessler
(74) *Attorney, Agent, or Firm* — Buchanan Ingersoll & Rooney P.C.

(57) ABSTRACT

A powder for use in the powder metallurgical manufacture of components is provided. Particularly the subject matter concerns an iron or iron based powder intended for the powder metallurgical manufacturing of components. It is especially suitable for manufacturing of components wherein self-lubricating properties are desired. The subject matter further relates to a method of manufacturing a component from said powder and an accordingly produced component. A diffusion-bonded powder comprising iron or iron-based particles, and particles diffusion-bonded to the iron or iron-based particles is provided. The said particles diffusion-bonded to the iron or iron-based particles may comprise an alloy of Cu and 5% to 15% by weight of Sn. A component is provided which is at least partly formed from such a diffusion-bonded powder.

13 Claims, 1 Drawing Sheet

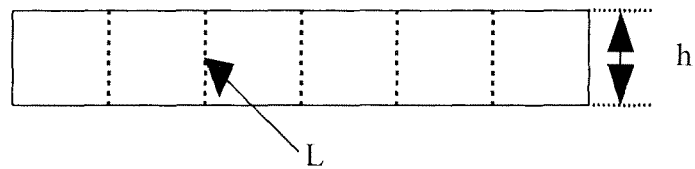

POWDER, METHOD OF MANUFACTURING A COMPONENT AND COMPONENT

FIELD OF THE INVENTION

The present invention relates to a powder for the powder metallurgical manufacture of components. Particularly the invention concerns an iron or iron based powder intended for the powder metallurgical manufacturing of components. It is especially suitable for manufacturing of components wherein self-lubricating properties are desired. The invention further relates to a method of manufacturing a component from said powder and an accordingly produced component.

BACKGROUND OF THE INVENTION

Powder metallurgical manufacturing techniques are generally characterized by long series production of components having good dimensional accuracy. The manufacturing sequence is generally started by mixing a metallic powder with a lubricant in order to simplify a subsequent compression operation. The metallic powder may e.g. be a powder formed of pre-alloyed atomised particles, a powder admixed with alloying elements in powder form, or a powder wherein alloying elements are diffusion-alloyed or diffusion-bonded to a metal base powder. The compacted (green) component is then heated and is retained at a temperature, at which the green component obtains, by means of sintering, its final characteristics with regard to strength, ductility etc.

Bronze powder is commonly used in production of sintered self-lubricating bearings. The use of bronze will give the bearing favourable characteristics such as quiet running and good wear resistance, bronze is also less prone to corrosion. In order to reduce the costs however iron powder is added for production of so called diluted bronze bearings. It is common to use about 40-60% by weight of iron powder. The bearings often replace bronze bearings in fractional horse power motors and applications.

Diffusion-bonded powders are known from several publications. In the GB patent 1162702 (1965) a process for preparing a powder is disclosed. In this process alloying elements are diffusion-bonded (partially alloyed) to the iron powder particles. An unalloyed iron powder is heated together with alloying elements, such as copper and molybdenum, in a reducing atmosphere at a temperature below the melting point to cause pre-alloying and agglomeration of the particles. The heating is discontinued before complete alloying and the obtained agglomerate is ground to a desired size. Also the GB patent 1595346 (1976) discloses a diffusion-bonded powder. The powder is prepared from a mixture of an iron powder and a powder of copper or easily reducible copper compounds. The obtained powder wherein copper is diffusion-bonded to the iron powder is distinguished by high compressibility and low risk of segregation and dusting.

A different technology of providing copper on atomised powder particles is disclosed in JP 59-050101 (1982) which concerns an atomized iron powder containing at least 0.05% by weight of tin. This powder is then coated with a copper layer.

SUMMARY OF THE INVENTION

It is an object of the present invention to provide a metallurgical powder suitable for the manufacturing of components, such as sintered bearings comprising bronze and especially self-lubricating bearings comprising bronze.

Another object is to provide a method of manufacturing a component suitable for use as a bearing.

Yet another object is to provide a component suitable for use as a bearing.

It has now been found, that by preparing a powder having tin and copper diffusion-bonded to the particles of an iron or iron-based powder, a metallurgical powder, hereafter referred to as a diffusion-bonded powder, is obtained and that this new diffusion-bonded powder can be used for the production of components having an unexpectedly high surface concentration of bronze compared to the nominal concentration of bronze in the component. Due to the fact that bronze is an expensive metal this is a significant advantage as this makes it possible to use less bronze. The present invention provides a method and a diffusion bonded powder based on iron or iron-based particles allowing use of a smaller amount of bronze compared to components produced from a plain mixture of bronze powder and iron or iron-based powder.

According to one embodiment an oxidised bronze powder can be used as a starting material for producing the diffusion-bonded powder. In this context oxidised bronze powder or bronze oxide powder may be described as a powder containing copper, tin and oxygen and may be produced from bronze powder which has partly or fully been oxidised, however oxidised bronze powder irrespective of the manufacturing method may be used. To use an oxidized bronze powder with a particle size distribution where $X_{50}<15$ μm, preferably <10 μm facilitates to partly cover the iron powder particles with bronze after the diffusion annealing. By not adding tin as an elemental powder, melting of the tin during the diffusion annealing is avoided, and thus less tin will dissolve into the iron and will instead be present in the bronze alloy. By having the iron powder particles covered to a large extent by bronze, the surface of the pressed and sintered parts, for example self-lubricating bearings, will have a surface concentration of bronze higher than the nominal bronze content.

Thus, the above objects are achieved by the present invention by providing a diffusion-bonded powder comprising iron or iron-based particles having particles containing or comprising Cu and Sn diffusion-bonded to the iron or iron-based particles. Specifically the particles containing Cu and Sn should comprise Cu and 5% to 15% by weight of Sn.

Another advantage of using a diffusion-bonded powder in comparison with using a plain mixture of the corresponding individual powders of iron, copper and tin, or pre-alloyed Cu—Sn alloy is that less segregation occur during the handling of the powder.

Preferred embodiments follow from the dependent claims.

In brief the process for preparing the diffusion-bonded powder according to the present invention includes heating an iron or iron-based powder together with the compounds containing the alloying elements tin and copper in a reducing atmosphere at a temperature below the melting point of the alloying elements to cause partially alloying (diffusion-bonding) and agglomeration of the particles. The alloying elements tin and copper might be present in a pre-alloyed state, i.e. a bronze powder or a powder of oxidised bronze. The obtained agglomerates are then ground to a desired size.

The small particles of the compounds containing the alloying elements may be adhered to the iron particles by the use of a small amount of binder, such as PEG, before the heating.

According to the present invention the diffusion-bonding of the alloying particles to the iron particles is suitably performed in a furnace at atmospheric pressure with a temperature of, 750-830° C. for a time of 15-180 minutes in a reducing atmosphere such as dissociated ammonia, $H_2$ or $N_2/H_2$.

The content of iron or iron-based particles in the diffusion-bonded powder is 50% to 90% by weight, and the remaining part of the diffusion-bonded powder comprises 10% to 50% by weight of copper and tin and inevitable impurities.

The term iron-based particles describe particles where iron is alloyed with one or more alloying elements.

Impurities describe components which are present in such a low amount that their presences do not influence the properties of the product or the process where the impurities are present.

The amount of Sn in the particles comprising Cu and Sn may vary between 5 to 15%, preferably 8-12% by weight. When the amount of Sn in these particles is below 5% by weight the bronze material will become too soft and when the amount of Sn in these particles is above 15% by weight secondary phases may be formed. In accordance with one embodiment these particles consists of Cu and Sn and inevitable impurities, such as low amounts of oxygen, i.e. less than 0.5%.

The object of providing a method of manufacturing a component has been achieved with a method comprising the following steps: providing a diffusion-bonded powder as discussed above, compacting the diffusion-bonded powder at a pressure of 200-600 MPa thereby forming a powder compact and sintering the powder compact.

By manufacturing a component in accordance with this method the combination of a specific diffusion-bonded powder, the compacting pressure of 200-600 MPa and the sintering results in a component having a desired performance for bearing materials, such as low friction, low wear, high load capacity. By varying the compacting pressure, the density of the component and thereby also the strength and the porosity of the component may be varied depending on the application of use. If the density is too low the strength will not be high enough and if the density is too high the porosity is too low to allow a lubricant to be applied in the component in a sufficient amount.

The object of providing a component suitable for use as a bearing is achieved with a component manufactured from the diffusion-bonded powder discussed above. Such a component will have the desired performance concerning bearing applications. The component is suitably manufactured using the method discussed above.

A component manufactured by the method discussed above has a surface concentration of bronze higher than the nominal concentration of bronze in the component. In this context the "nominal concentration" is the concentration calculated by dividing the amount of added bronze with the total quantity of used powder.

The sintered component may further comprise a lubricant. In the context of the present application the term "lubricant" should be distinguished from the term "lubricating agent". The lubricating agent is used in connection with the compaction operation whereas the lubricant is used in the sintered component. By providing a lubricant in the sintered component, making use of the pores, a self-lubricating component such as a bearing may be obtained. Such lubricants may be solid or liquid depending on the actual application of use. To provide a solid lubricant, the powder may be mixed, before compaction, with graphite in an amount of 0.5-2% by weight.

The sintered component may have a density of between 5.5 and 6.5 g/cm$^3$. The density of the component may be varied depending on the application of use. If the density is too low the strength will not be high enough and if the density is too high the porosity is too low to allow a lubricant to be applied in the component in a sufficient amount.

BRIEF DESCRIPTION OF THE DRAWINGS

FIG. 1 shows a side view of a pressed sample with scanned lines in SEM.

DESCRIPTION OF PREFERRED EMBODIMENTS

The iron or iron-based particles are e.g. water atomised powders or sponge iron powders. Suitable iron powders are e.g. NC100.24, SC100.26, ASC100.29, MH80.23. The particle size of these iron powders is below 250 μm.

NC100.24 is a sponge iron powder available from Höganäs AB, Sweden, having an apparent density of about 2.45 g/cm$^3$ and a particle size substantially below 150 μm, the amount of particles smaller than 45 μm is about 18%.

SC100.26 is a sponge iron powder available from Höganäs AB, Sweden, having an apparent density of about 2.65 g/cm$^3$ and a particle size substantially below 150 μm, the amount of particles smaller than 45 μm is about 20%.

ASC100.29 is an atomized iron powder available from Höganäs AB, Sweden, having an apparent density of about 2.98 g/cm$^3$ and a particle size substantially below 150 μm, the amount of particles smaller than 45 μm is about 23%.

MH80.23 is a sponge iron powder available from Höganäs AB, Sweden, having an apparent density of about 2.30 g/cm$^3$ and a particle size substantially below 150 μm, the amount of particles smaller than 45 μm is about 3%.

The particles comprising Cu and Sn comprise 85% to 95% by weight of Cu and 5% to 15% by weight of Sn. Suitable powders comprising Cu and Sn to be used for diffusion-bonding are powders having $X_{50}$ 1-15 μm, preferably $X_{50}$ 1-10 μm.

The diffusion-bonded powder comprises 50% to 90% by weight of iron or iron-based particles and 10% to 50% by weight of particles diffusion-bonded to the iron or iron-based particles. The diffusion-bonded powder may be denoted diluted bronze.

A component is manufactured by optionally mixing the diffusion-bonded powder with a lubricating agent, compacting the powder at a pressure of 200-600 MPa thereby forming a powder compact, followed by sintering the powder compact.

Before compacting, the diffusion-bonded powder may also be mixed with a lubricating agent, such as metal stearate, e.g. zinc stearate, or a wax such as ethylene bisstearamide (EBS). This facilitates the compaction and the wear of the compaction tool will be decreased.

Graphite may also be added to the diffusion-bonded powder before compaction to provide a solid lubricant in a component made by the powder.

The sintering process is suitably performed at a temperature below the liquid phase forming temperature of the bronze powder. For a bronze having a Sn-content of 10% the liquid phase forming temperature is about 855° C., thus a preferred sintering temperature is between 800 to 830° C. during a period of 5-60 minutes. The sintering atmosphere may be hydrogen, a mixture of nitrogen and hydrogen, dissociated ammonia or endogas.

The sintered component manufactured accordingly will have a surface concentration of bronze higher than the nominal concentration of bronze in the component. As can be seen from table 1 the powders according to the present invention show an evident increase of the surface concentration of copper whereas the reference powder does not show any increase of the surface copper. The concentration of copper has here been used to measure the concentration of bronze as copper is more easily analysed.

In use the sintered component suitably comprises a lubricant. Examples of such lubricants are mineral oil, synthetic oil, silicone oil or fluorinated oils. The lubricant may be introduced in a bearing e.g. by impregnating the component. The component has interconnected porosity thereby providing sufficient lubricant receiving capacity. The component may have a density of between 5.5 and 6.5 g/cm$^3$.

EXAMPLES

Example 1

Powder According to the Invention

NC100.24 Iron powder was mixed with an oxidised bronze (9 parts Cu and 1 part Sn, the ratio Cu/Sn being 9:1) in two different amounts to form three different samples. The bronze powder has a particle size distribution of $X_{50}$=2.2 μm and 9.4 μm, respectively ($X_{50}$ denotes the average particle size by weight).

In order to prevent the segregation of the fine particles 0.1% PEG400 has been used as binder.

The mixture was annealed for 90 minutes at 800° C., H2-atmosphere. The annealed powder was then crushed (milled), and sieved at 212 μm screens. The content of bronze was 20% by weight (sample 1 and 2) and 25% by weight (sample 3).

The new materials were mixed with 0.8% Ethylenebis stearamide before pressing.

The powder was pressed at 400 MPa and the components (rectangular parts 90×12 mm, h=5 mm) was sintered at 830° C. for 20 minutes in an atmosphere of dissociated ammonia (75% H2+25% N2).

Reference Powder

NC100.24 Iron powder was mixed with 20% pre-alloyed bronze powder (90% Cu and 10% Sn) additive with a particle size below 160 μm and 0.8% Ethylenebis stearamide. The powder was pressed at 400 MPa and the components (rectangular parts 90×12 mm, h=5 mm) were sintered at 830° C. for 20 minutes in an atmosphere of dissociated ammonia (75% H2+25% N2).

Evaluation Method

Copper distribution was analysed in a JEOL 5800 scanning electron microscope (SEM) by X-Ray energy-dispersive spectrometer (EDS) from Link. Accelerating voltage of 20 kV was used for the analysis. Copper distribution was analysed on a side surface (surface against the die-wall during pressing) of a pressed sample. For each sample five line scans (L) were carried out over the whole height (h) according to FIG. 1. A total length of 22 mm was scanned. Distance between each analysed point along the scanned line (L) was 4 μm.

Result from SEM Analysis

The concentration of Cu at the surface facing the die-wall (corresponds to the sliding surface in a self lubricating bearing) is higher than the Cu concentration of the surface of the component made of reference powder, despite the same concentration, due to the better distribution. All material produced by using the new powder shows higher surface concentration of Cu than material prepared from the reference powder (table 1). Despite of the same initial amount of bronze powder in the mixes the mean value of total copper concentration at the sliding surface for the new material is approximately 40% higher than the reference material (elemental mixture).

The green and sintered densities of the samples are shown in table 2.

TABLE 1

| Sample | Powder | Surface Cu concentration | Surface Cu concentration relative to nominal concentration |
|---|---|---|---|
| Ref | NC100.24 + 20% Bronze powder 90/10-160 | 17.3% | 96% |
| 1 | NC100.24 + 20% Bronze powder (2.2 μm) | 25.2% | 140% |
| 2 | SC100.26 + 25% Bronze powder (2.2 μm) | 33.4% | 148% |
| 3 | NC100.24 + 20% Bronze powder (9.4 μm) | 25.5% | 142% |

TABLE 2

| Sample | Green Density (g/cm$^3$) | Sintered Density (g/cm$^3$) |
|---|---|---|
| Ref | 6.68 | 6.71 |
| 1 | 6.47 | 6.44 |
| 2 | 6.53 | 6.51 |
| 3 | 6.47 | 6.45 |

Example 2

Powder According to the Invention

NC100.24 Iron powder was mixed with an oxidized bronze powder (9 parts Cu and 1 part Sn, the ratio Cu/Sn being 9:1) to form sample 4. The bronze powder has a particle size distribution of $X_{50}$=5.4 μm ($X_{50}$ denotes the average particle size by weight) and a total oxygen content of 13.8%. The nominal content of bronze in sample 4 was 20% by weight.

In order to prevent the segregation of the fine particles 0.1% PEG400 has been used as binder in the mixture.

The mixture was annealed for 90 minutes at 800° C., H2-atmosphere. The annealed powder was then crushed (milled), and sieved at 212 μm screens.

The materials were mixed with 0.8% Ethylenebis stearamide before pressing.

The powder was pressed at 400 MPa and the components (rectangular parts 30×12 mm, h=6 mm) was sintered at 830° C. for 20 minutes in an atmosphere of dissociated ammonia (75% H2+25% N2).

Reference Powder

Reference 2: NC100.24 Iron powder was mixed with 20% pre-alloyed bronze powder (90% Cu and 10% Sn) additive with a particle size below 160 μm and 0.8% Ethylenebis stearamide. The powder was pressed at 400 MPa and the components (rectangular parts 30×12 mm, h=6 mm) were sintered at 830° C. for 20 minutes in an atmosphere of dissociated ammonia (75% H2+25% N2).

Reference 3: NC100.24 Iron powder was mixed with a cuprous oxide with a particle size distribution of $X_{50}$=15.1 μm and a total oxygen content of 11.5% and a tin powder with a particle size distribution of $X_{50}$=24.4 μm. Cuprous oxide powder and tin powder were added in proportions to obtain a ratio Cu/Sn being 9:1. The nominal content of bronze in reference 3 was 20%.

In order to prevent the segregation of the fine particles 0.1% PEG400 has been used as binder in the mixture.

The mixture was annealed for 90 minutes at 800° C., H2-atmosphere. The annealed powder was then crushed (milled), and sieved at 212 μm screens.

Evaluation Method

Copper and tin distribution was analysed in a JEOL 5800 scanning electron microscope (SEM) by X-Ray energy-dispersive spectrometer (EDS) from Link. Accelerating voltage of 20 kV was used for the analysis. Copper and tin distribution was analysed on a side surface (surface against the die-wall during pressing) of a pressed sample. For each sample a line scan (L) was carried out over a total length of 6.5 mm. Distance between each analysed point along the scanned line (L) was 4 μm.

Result from SEM Analysis

The concentration of Cu of sample 4 at the surface facing the die-wall (corresponds to the sliding surface in a self lubricating bearing) is 55% higher than the nominal Cu concentration the material, whereas the concentration of Cu at the same surface of the component made of reference powder 2 is lower than the nominal copper concentration. Surface concentrations of tin show the same pattern as for copper, surface concentration of sample 4 is 29% higher than the nominal content, whereas the concentration of Sn at the same surface of the component made of reference powder 2 is lower than the nominal copper concentration. Reference 3 has a surface copper concentration 6% higher than the nominal content and a surface tin concentration lower than the nominal tin content of the material.

Despite sample 4, reference powder 2 and reference powder 3 have the same total amount of bronze in the initial materials, the mean values of total copper and tin concentration at the sliding surface for the end material is approximately 55% and 29%, respectively, higher than the nominal contents. The reference material 2 (elemental mixture) and reference material 3, which is not within the scope of this invention, does not exhibit any significantly increased surface concentrations of copper and tin.

The green and sintered densities of the samples are shown in table 4.

TABLE 3

| Sample | Surface Cu conc. | Surface Cu concentration relative to nominal concentration | Surface Sn conc. | Surface Sn concentration relative to nominal concentration |
|---|---|---|---|---|
| 4 | 27.9% | 155% | 2.33% | 129% |
| Ref 2 | 13.6% | 75.9% | 1.28 | 64.0% |
| Ref 3 | 19.1% | 106% | 1.81 | 90.1% |

TABLE 4

| Sample | Green Density (g/cm³) | Sintered Density (g/cm³) |
|---|---|---|
| 4 | 6.50 | 6.47 |
| Ref 2 | 6.62 | 6.60 |
| Ref 3 | 6.49 | 6.46 |

The invention claimed is:

1. A diffusion-bonded powder comprising iron or iron-based particles and particles diffusion-bonded to the iron or iron-based particles, where said particles diffusion-bonded to the iron or iron-based particles comprise an alloy of Cu and 5% to 15% by weight of Sn,
    and wherein said particles diffusion-bonded to the iron or iron-based particles constitute 10% to 50% by weight of the total weight of the said diffusion bonded powder.

2. A powder according to claim 1, wherein 50% to 90% by weight are iron or iron-based particles.

3. A powder according to claim 1, wherein the particles diffusion-bonded to the iron or iron-based particles comprise 85% to 95% by weight of Cu.

4. A powder according to claim 1, wherein the particles diffusion-bonded to the iron or iron-based particles have a particle size distribution where the average particle size by weight, $X_{50}$ is 1-15 μm.

5. A powder according to claim 1, further comprising graphite added in an amount of 0.5-2% by weight.

6. A powder according to claim 1, wherein the particles diffusion-bonded to the iron or iron-based particles have a particle size distribution where the average particle size by weight, $X_{50}$ is 1-10 μm.

7. A method of manufacturing a component comprising:
    providing a powder according to claim 1,
    compacting the powder at a pressure of 200-600 MPa thereby forming a powder compact, and
    sintering the powder compact.

8. A method according to claim 7, further comprising, before compacting, mixing the powder with a lubricating agent.

9. A method for manufacturing a diffusion-bonded powder according to claim 1, comprising the following steps:
    providing a bronze powder having a median particle size distribution $X_{50}$<15 μm,
    mixing the bronze powder with an iron or iron-based powder having a particle size below 250 μm,
    annealing the mixture at a temperature of 750-830° C. for a time of 15-180 minutes in a reducing atmosphere, and
    crushing the annealed mixture to a powder and sieving the powder.

10. A method according to claim 9, wherein the bronze powder is an oxidized bronze.

11. A method according to claim 9, wherein the bronze powder has a median particle size distribution $X_{50}$<10 μm.

12. A method according to claim 9, wherein a binder has been added to the mixture of bronze powder and iron or iron-based powder before annealing the mixture.

13. A method according to claim 10, wherein the bronze powder has a median particle size distribution $X_{50}$<10 μm.

* * * * *